United States Patent [19]

Wilhite

[11] Patent Number: 5,257,647

[45] Date of Patent: Nov. 2, 1993

[54] FOUNTAIN ATTACHMENT FOR A FAUCET

[75] Inventor: Gerald Wilhite, Duncanville, Tex.

[73] Assignee: William C. Crutcher, Middlebury, Conn.

[21] Appl. No.: 57,150

[22] Filed: May 5, 1993

[51] Int. Cl.⁵ ............................................. F16K 21/00
[52] U.S. Cl. .................................. 137/801; 137/875; 251/299
[58] Field of Search ............... 137/861, 872, 875, 800, 137/801; 251/299

[56] References Cited

U.S. PATENT DOCUMENTS

| | | | |
|---|---|---|---|
| 5,086 | 10/1872 | Zwietusch | 251/299 |
| 1,157,907 | 10/1915 | Sperry | 137/801 |
| 2,524,956 | 10/1950 | Brunetti | 137/875 |
| 3,933,177 | 1/1976 | Dwyer, Jr. | 137/861 |
| 4,199,008 | 4/1980 | Bright | 137/800 |
| 4,927,061 | 5/1990 | Leigh et al. | 137/801 |

*Primary Examiner*—A. Michael Chambers

*Attorney, Agent, or Firm*—William C. Crutcher

[57] ABSTRACT

A fountain attachment for a faucet, comprising a tubular body of rigid plastic material, a closure member of rigid plastic material hinged to the short rear wall of the tubular body and adapted to be pivoted to cover its inclined outlet end, a fountain spout formed in the long front wall of the tubular body with an inclined passage terminating at its upper end in an upwardly directed spout opening and terminating at its lower end within the tubular body, and a tubular insert of yieldable plastic material disposed inside the tubular body, with its top end disposed within the top end of the tubular body and spaced therefrom by an annular gap and adapted for frictional fit with a faucet, the tubular insert further having a mid section supported within the tubular body and a bottom end comprising a sealing flange extending beyond the bottom end of the tubular body, the sealing flange providing a seal with the closure member when the closure member is pivoted to cover the outlet end of the tubular body.

10 Claims, 2 Drawing Sheets

FOUNTAIN ATTACHMENT FOR A FAUCET

BACKGROUND OF THE INVENTION

This invention relates generally to water drinking fountains and more particularly relates to an improved fountain attachment for a water facet, especially a water faucet equipped with an aerator.

Many fountain attachments for water faucets have been proposed in the past which let the faucet serve the dual purpose of discharging a stream of water downwardly for utilitarian purposes and also direct a jet of water upwardly for drinking directly from the jet. These prior art faucet fountain attachments have generally employed pivotable members designed to allow the discharge of water in one position and to direct the flow of water in a drinking jet in another pivoted position.

A number of faucet fountains are disclosed in the prior art which are threaded or clamped to the faucet outlet so as to hold them in place and prevent leakage. These are difficult to attach or require special tools.

An improved faucet fountain is disclosed in U.S. Pat. No. 4,934,597 issued Jun. 19, 1992 to William Crutcher with a tubular body of yieldable plastic material adapted for frictional engagement with the discharge end of a water faucet. A preferred material was flexible polyurethane which was yieldable and also suitable for a living hinge connecting the tubular body with the closure member, enabling injection molding of the faucet fountain in a single piece. Yieldable plastic material not only allows accomodation of variations in aerator shape and diameter for the frictional engagement, but also provides a better sealing surface to prevent leakage around the closure member at the discharge end of the faucet fountain.

On the other hand it is possible to reduce the cost of the plastic material, to utilize a less expensive hinged flap and to obtain improved exterior appearance in some cases by using rigid thermosetting plastics such as ABS, or PVC, which are easily molded and cost less to produce. However these plastics are not easy to attach to different size aerators by friction fit, because they do not yield as much to accomodate variations in size and diameter. Therefore several different sizes are required unless a clamping device is used. Also hard plastics do not give a good seal when the closure member is pivoted against the discharge end to divert the flow of water into the fountain outlet. There may be other types of rigid materials such as die cast metal or fabricated metal shells or metallized plastics, which provide more choices in external appearance.

It would be desirable to have an easily attachable and detachable faucet fountain with an exterior made of rigid material, which fits a variety of faucet aerator sizes, and which provides a good seal with the closure member at the discharge end.

Accordingly, one object of the present invention is to provide an improved fountain attachment for a faucet which is simple, inexpensive and provides a pleasing external appearance.

Another object of the invention is to provide an improved fountain attachment of rigid material with a hinged flap which fits a variety of aerator sizes and has a good seal with the flap at the discharge end.

SUMMARY OF THE INVENTION

Briefly stated, the invention described is a fountain attachment for a faucet, comprising a tubular body of rigid material with a first inlet end and a first outlet end, the tubular body having a rear wall portion and a front wall portion each extending between the first inlet end and the first outlet end, a closure member of rigid material pivotably connected to the rear wall portion and adapted to be pivoted over the first outlet end, a fountain spout formed in the front wall portion and defining an inclined passage terminating at its upper end in an upwardly directed spout opening and terminating at its lower end within the tubular body, and a tubular insert of yieldable plastic material disposed inside the tubular body, the tubular insert having a second inlet end disposed within the first inlet end of the tubular body and spaced therefrom by an annular gap, the second inlet end being adapted for frictional fit with a faucet aerator, the tubular insert further having a mid section adapted to be supported within the tubular body and a second outlet end comprising a sealing flange extending beyond the first outlet end of the tubular body, the sealing flange being arranged and adapted to provide a seal with the closure member when the closure member is pivoted to cover the outlet end of the tubular body.

DRAWING

Other objects and advantages will best be understood by reference to the following description, taken in connection with the accompanying drawings in which:

FIG. 1 is a side elevational view, of the assembled fountain attachment and a faucet with aerator, just prior to attachment, illustrating a preferred embodiment of my invention, FIG. 2 is a top plan view of the assembled fountain attachment, shown in FIG. 1, FIG. 3 is an enlarged side elevational cross-sectional view of the FIG. 1 assembled fountain attachment, taken along the lines III—III of FIG. 2, FIG. 4 is a plan view of the closure member used in the assembly of FIGS. 1-3, looking toward the closure surface, FIG. 5 is a side elevational view of the closure member in cross section taken along the lines V—V of FIG. 4

FIG. 6 is a front elevational view of the tubular body used in the assembly of FIGS. 1-3, FIG. 7 is a side elevational view of the tubular body in cross section taken along the lines VII—VII of FIG. 6, FIG. 8 is a front elevational view of the tubular insert used in the assembly of FIGS. 1-3, and FIG. 9 is a side elevational view of the tubular insert in cross section taken along the lines IX—IX of FIG. 8.

DESCRIPTION OF THE PREFERRED EMBODIMENT

Figure 1:
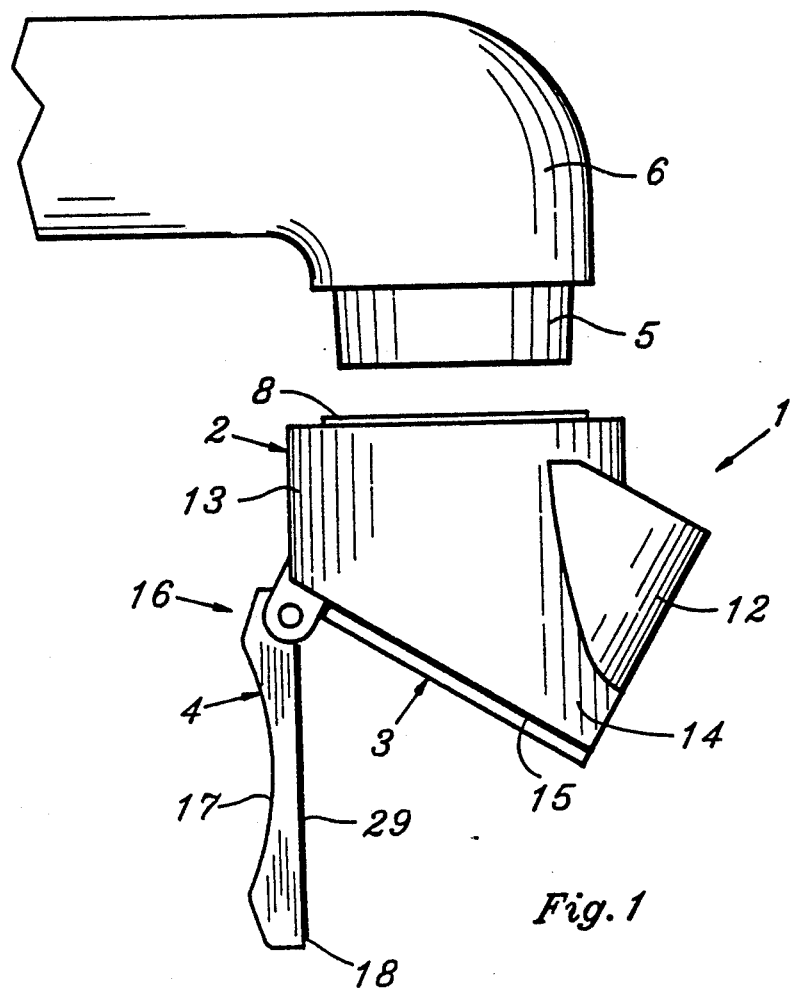

Referring now to FIG. 1 of the drawing, a fountain attachment assembly, shown generally at 1, comprises a tubular body 2, a tubular insert 3 and a closure member 4 pivotably connected to the tubular body 2. The assembly 1 is adapted for attachment to the end of a conventional aerator 5 protruding from a water faucet 6.

Figure 2:
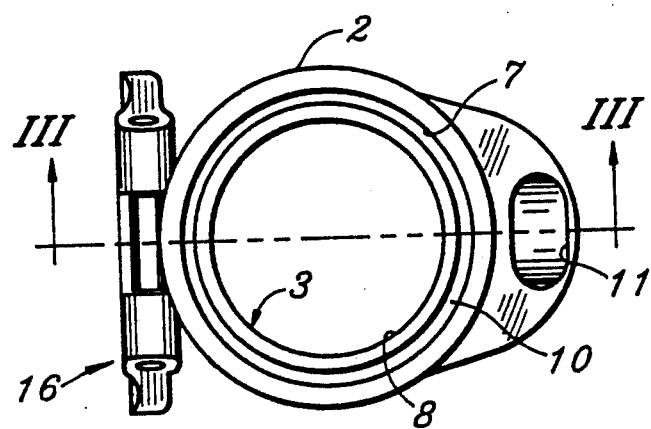

Reference to FIG. 2 of the drawing further shows the tubular body 2 to have a first inlet end 7, which encloses a second inlet end 8 of the tubular insert 3. The inlet ends 7 and 8 of the tubular body 2 and tubular insert 3, respectively, are separated by an annular gap 10. Fountain assembly 1 further includes a fountain spout outlet opening 11, which is connected to the interiors of the tubular members 2, 3 by an inclined passage inside a spout 12 molded into body 2.

Reference to the side elevation of FIG. 1 shows that the rear wall 13 of the tubular body is short and the front wall 14 is long, so as to provide an inclined discharge opening at a first outlet end 15. The closure member 4 is pivotably connected to the short wall exterior by a hinge shown generally at 16, by means of a hinge pin 16a, and is adapted to cover the discharge or second outlet end 15 when pressed with a finger. Other types of hinges, may be suitable, such as providing oppositely directed plastic protrusions on one member for snap fitting into sockets on the other member. The rear surface 17 of the closure member is contoured to fit a finger and the front surface 18 is substantially flat, and is provided with a raised annular sealing bead 29.

In accordance with the teaching of the abovementioned U.S. Pat. No. 4,934,597, which is incorporated herein by reference, the tubular body 2 and tubular insert 3 together make up a tubular assembly adapted for frictional engagement with a faucet and having an inclined discharge opening and a closure member adapted to block the discharge opening and direct a stream of drinking water through a fountain outlet defined in the long front wall of the tubular member. This invention deals with certain improvements in the type of frictional faucet engagement, and the discharge end seal, permitting a different type hinge and use of other rigid materials for some of the components.

Figure 3:
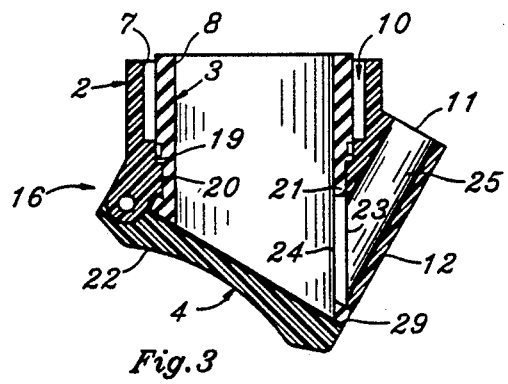

Referring now to FIG. 3 of the drawing the assembly shows that the interior of tubular body 2 has three internal diameters, a larger diameter section comprising the first inlet end 7, an intermediate diameter section 19 and a smaller diameter section 20. The tubular insert 3 has a larger external diameter section forming the second inlet end 8, a smaller external diameter section 21 and a terminating flat flange 22. The internal diameter of tubular insert 3 is substantially uniform. The flange 22 extends both radially and longitudinally beyond the first outlet end of the tubular body 2, so as to be interposed between the tubular body 2 and the closure member 4. Flange 22 presents a flat surface for sealing when the closure member is pivoted to the position shown in the drawing. The annular bead 29 is located to indent the flat surface of the yieldable material used for the tubular insert flange 22, to improve the seal.

The tubular body 2 defines an opening 23 in the long front wall 14 and the tubular insert likewise defines an opening 24 of similar size in its long front wall. Openings 23, 24 are connected to the fountain outlet opening 11 by an inclined passage 25, which is thus connected to the interior of the tubular insert between its inlet end 8 and the flange 22.

Reference to FIGS. 4-9 will clarify the construction of the component parts of the preferred embodiment, by showing front elevational and top views of the unassembled parts.

Figure 4:
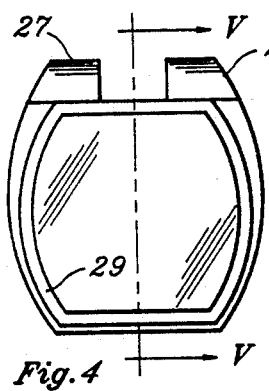
Figure 5:
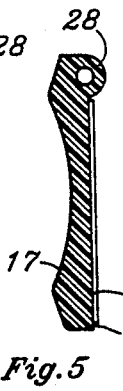

FIGS. 4 and 5 together illustrate the closure member having the elements with reference numbers described above. A pair of hinge lugs 27, 28 are spaced to receive the hinge lug 26. The small annular sealing bead 29 is molded on the flat surface 18 of the closure member 4 to improve the sealing action with the flange 22 on the tubular insert 3.

Figures 6, 7:
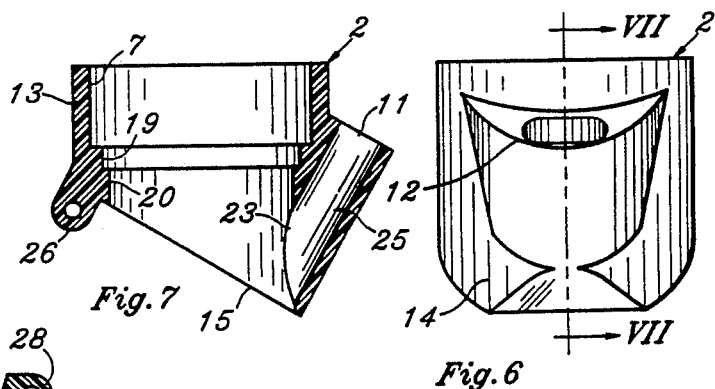

FIGS. 6 and 7 together illustrate the tubular body having the elements with reference numbers described above. The tubular body is preferably molded of rigid plastic material such as ABS, polycarbonate, rigid PVC or other rigid material such as die cast metal. A hinge lug 26 is molded or cast onto to the exterior of the short wall 13.

Figures 8, 9:
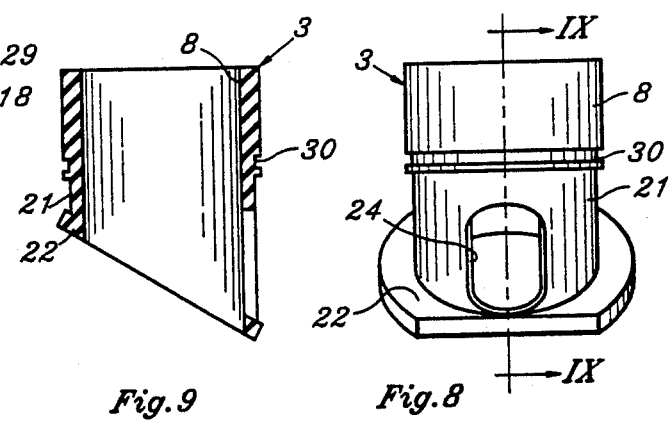

FIGS. 8 and 9 together illustrate the tubular insert having the elements with reference numbers described above. Tubular insert 3 is molded of flexible or yieldable plastic material such as flexible polyurethane or an elastomeric plastic. A circumferential groove 30 gives added flexibility for movement of the second inlet end 8 relative to the first inlet end 7, which reduces any tendency towards leakage between members 2, 3.

Thus there has been described an improved fountain attachment for a faucet which combines a rigid outer tubular body with a flexible inner tubular insert. The insert serves to attach the fountain by frictional engagement at the upper end and to provide a sealing gasket at the lower end, to improve the seal with a pivotable closure member.

While there has been described herein what is considered to be the preferred embodiment of the invention, other modifications will become apparent to those skilled in the art and it is intended to included all such modifications as fall within the true spirit and scope of the invention.

I claim:

1. A fountain attachment for a faucet, comprising:
   a tubular body of rigid material with a first inlet end and a first outlet end, said tubular body having a rear wall portion and a front wall portion each extending between said first inlet end and said first outlet end,
   a closure member of rigid material pivotably connected to said rear wall portion and adapted to be pivoted over said first outlet end,
   a fountain spout formed in said front wall portion and defining an inclined passage terminating at its upper end in an upwardly directed spout opening and connected at its lower end to the interior of said tubular body, and
   a tubular insert of yieldable material disposed inside said tubular body, said tubular insert having a second inlet end disposed within said first inlet end of said tubular body, said second inlet end being adapted for frictional fit with said faucet, said tubular insert further having a mid section adapted to be supported within said tubular body and a second outlet end comprising a sealing flange extending beyond the first outlet end of said tubular body, said sealing flange being arranged and adapted to provide a seal with said closure member when the closure member is pivoted to cover the outlet end of said tubular body.

2. The combination according to claim 1 wherein said second inlet end of said tubular insert is spaced from said first inlet end of said tubular body by an annular gap to provide additional flexibility within said tubular body.

3. The combination according to claim 1, wherein said tubular insert defines at least one circumferential groove about said midsection to provide additional flexibility within said tubular body.

4. The combination according to claim 1, wherein said tubular insert defines an opening aligned with the lower end of said inclined passage.

5. The combination according to claim 1, wherein said tubular insert comprises a flexible plastic material.

6. The combination according to claim 5, wherein said tubular body and said closure member each comprise a rigid plastic material.

7. The combination according to claim 5, wherein said tubular body and said closure member are both made of metal.

8. The combination according to claim 1 wherein said rear wall portion is short and wherein said front wall portion is long, whereby said first outlet end provides an inclined discharge opening.

9. The combination according to claim 1, wherein the side of said closure member covering said first outlet end defines an annular sealing bead arranged to indent said sealing flange to improve the seal.

10. A fountain attachment for a faucet, comprising:
a tubular body of rigid plastic material with a first inlet end and a first outlet end, said tubular body having a rear wall portion and a front wall portion each extending between said first inlet end and said first outlet end,
a closure member of rigid plastic material pivotably connected to said rear wall portion and adapted to be pivoted over said first outlet end,
a fountain spout formed in said front wall portion and defining an inclined passage terminating at its upper end in an upwardly directed spout opening and connected at its lower end to the interior of said tubular body, and
a tubular insert of yieldable plastic material disposed inside said tubular body, said tubular insert having a second inlet end disposed within said first inlet end of said tubular body and spaced therefrom by an annular gap, said second inlet end being adapted for frictional fit with said faucet, said tubular insert further having a mid section adapted to be supported within said tubular body and a second outlet end comprising a sealing flange extending longitudinally and radially beyond the first outlet end of said tubular body, said sealing flange being arranged and adapted to provide a seal with said closure member when the closure member is pivoted to cover the outlet end of said tubular body.

* * * * *